J. SMITH.
Churn Dasher.
No. 69,718.
Patented Oct. 8, 1867.
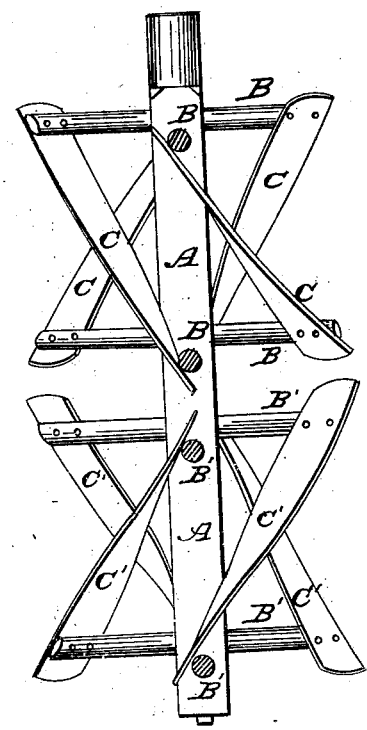

United States Patent Office.

JOHNSON SMITH, OF KANSAS, ILLINOIS.

*Letters Patent No. 69,718, dated October 8, 1867.*

---

IMPROVEMENT IN CHURN-DASHERS.

---

*The Schedule referred to in these Letters Patent and making part of the same.*

---

TO ALL WHOM IT MAY CONCERN:

Be it known that I, JOHNSON SMITH, of Kansas, in the county of Edgar, and in the State of Illinois, have invented certain new and useful improvements in Churn-Dashers; and do hereby declare that the following is a full, clear, and exact description thereof, reference being had to the accompanying drawings, and to the letters of reference marked thereon.

In the annexed drawings, making part of this specification, A represents a dasher-shaft, which is made four-sided, and placed in a vertical position in the churn, having a bearing in its bottom and one in the cover or lid. B B' represent a series of pins, which pass through the shaft A, all at right angles to the shaft, and half of them parallel and half at right angles to each other. C C' represent a series of slats, which are secured to the pins near their outer ends in the manner represented. The strips run diagonally across the shaft, and in order to be confined with their sides flat to the arms or pins, they are twisted or made slightly spiral in form. The upper series of slats C C are set at a reversed angle from those below, and marked C', so that when the dasher-staff or shaft is revolved, the lower series of slats will throw the milk or cream in one direction, while the upper ones will throw it in a reverse direction, thus causing great agitation, and readily breaking the globules, so as to release the small particles of butter.

What I claim, is—

The shaft B, with eight horizontal arms B', to which are connected the diagonal slats C C', in such a manner that their inner ends nearly meet at the centre of the shaft, so that the cream may be caught by the slat C, and carried to and under the slat C', as and for the purposes specified.

In testimony that I claim the foregoing I have hereunto set my hand this 30th day of May, 1867.

JOHNSON SMITH.

Witnesses:
    D. W. ZINK,
    JOSEPH HOLLIS.